(12) United States Patent
Lee et al.

(10) Patent No.: US 11,487,898 B2
(45) Date of Patent: Nov. 1, 2022

(54) SYSTEM FOR PROVIDING QUERY PROCESSING SERVICE BASED ON PERSONAL INFORMATION PROTECTION

(71) Applicant: MindwareWorks Co., Ltd., Seoul (KR)

(72) Inventors: Jae In Lee, Goyang-si (KR); Hyun Sun Cho, Seoul (KR)

(73) Assignee: MindwareWorks Co., Ltd., Seoul (KR)

( * ) Notice: Subject to any disclaimer, the term of this patent is extended or adjusted under 35 U.S.C. 154(b) by 298 days.

(21) Appl. No.: 16/765,175

(22) PCT Filed: Oct. 16, 2018

(86) PCT No.: PCT/KR2018/012145
§ 371 (c)(1),
(2) Date: May 19, 2020

(87) PCT Pub. No.: WO2019/132198
PCT Pub. Date: Jul. 4, 2019

(65) Prior Publication Data
US 2020/0349278 A1 Nov. 5, 2020

(30) Foreign Application Priority Data
Dec. 26, 2017 (KR) .................. 10-2017-0179222

(51) Int. Cl.
*H04L 29/06* (2006.01)
*G06F 15/16* (2006.01)
(Continued)

(52) U.S. Cl.
CPC ...... *G06F 21/6245* (2013.01); *G06F 16/9035* (2019.01); *G06F 16/90335* (2019.01); *H04L 67/01* (2022.05)

(58) Field of Classification Search
CPC .......... G06F 21/6245; G06F 16/90335; G06F 16/9035; H04L 67/42
(Continued)

(56) References Cited

U.S. PATENT DOCUMENTS

| 11,018,959 B1 * | 5/2021 | Neill ....................... H04L 43/04 |
| 2019/0166102 A1 * | 5/2019 | Chizi ................... G06F 21/6245 |
| 2019/0348161 A1 * | 11/2019 | Liang ..................... G16H 50/20 |

FOREIGN PATENT DOCUMENTS

| CA | 2929269 C | * | 6/2019 | ......... G06F 21/6218 |
| KR | 10-2001-0086475 A | | 9/2001 | |

(Continued)

OTHER PUBLICATIONS

Smriti Bhagat; Classbased; graph anonymization for social network data; ACM:2009; pp. 766-777.*

(Continued)

*Primary Examiner* — Monjur Rahim
(74) *Attorney, Agent, or Firm* — Revolution IP, PLLC

(57) ABSTRACT

A system for providing a query processing service based on personal-information protection, includes: a client terminal configured to allow a user to input and send query content for solving a problem; a relaying and processing server configured to extract and process personal information contained in the query content received from the client terminal, transmit processed query content the processed personal information to a cloud service server, and transmit an answer to a query received from the cloud service server to the client terminal; and the cloud service server configured to generate the answer to the query by analyzing the processed query content received from the relaying and processing server, and transmit the answer to the query to the relaying and processing server.

4 Claims, 3 Drawing Sheets

100

(51) Int. Cl.
    *G06F 21/62*     (2013.01)
    *G06F 16/903*     (2019.01)
    *G06F 16/9035*     (2019.01)
    *H04L 67/01*     (2022.01)

(58) Field of Classification Search
    USPC .......................................................... 726/6
    See application file for complete search history.

(56) References Cited

FOREIGN PATENT DOCUMENTS

| | | |
|---|---|---|
| KR | 10-2005-0081576 A | 8/2005 |
| KR | 10-2007-0117758 A | 12/2007 |
| KR | 10-2008-0078555 A | 8/2008 |
| KR | 10-2009-0070218 A | 7/2009 |
| KR | 10-2010-0075018 A | 7/2010 |
| KR | 10-2017-0140804 A | 12/2017 |

OTHER PUBLICATIONS

International Search Report for PCT/KR2018/012145 dated Feb. 22, 2019 from Korean Intellectual Property Office.

* cited by examiner

SYSTEM FOR PROVIDING QUERY PROCESSING SERVICE BASED ON PERSONAL INFORMATION PROTECTION

TECHNICAL FIELD

The disclosure relates to a system for providing the query processing service, and more particularly to a system for providing a query processing service based on personal-information protection, in which personal information that needs to be protected is prevented from being transmitted to/stored in/managed by a cloud service server regardless of a user's awareness, when a service provider processes the query content, which is given by the user to solve a problem, through a public service or a cloud service.

BACKGROUND ART

A service provider for various services may make a request for various pieces of information to a user or receive the information so as to provide various services to the user, or a user may voluntarily provide various pieces of information to the service provider. However, such various pieces of information provided to the service provider by a user may include personal information that needs to be protected.

Regarding a method of protecting such a user's personal information, Korean Patent Publication No. 2001-0086475 (hereinafter, referred to as the "prior art") has proposed a customized service method of performing differentiated marketing based on a user's classification while preventing the user's personal information from leaking from a computer that an individual uses and manages to the outside.

However, the prior art is just limited to software previously installed in a user's previously defined and prepared network connector, but not related to technology for protecting personal information contained in input information of many unspecified users.

Recently, various cloud-based services have become widespread. With such spread of the services, important personal identification information and the like personal information (e.g. phone numbers, detailed addresses, e-mail addresses, account information, a user's location information, visit histories, etc.) are transmitted to an overseas cloud service server, and thus concern about information leakage has grown in terms of storage/management.

Specifically, query content, which contains information voluntarily provided by general users to solve a problem or information provided in response to a request of a service providing business, i.e. a service provider, may include personal information that needs to be protected whether the users intend or not, and the personal information is delivered to and stored and managed in a cloud/public based system by the service provider, thereby causing a problem of leaking the personal information.

Accordingly, technology is needed to prevent users' own important information, identification information, sensitive information and the like personal information from being exposed to a cloud service system (or a public service system) even though the corresponding information is specified/stated whatever the users intend or not while using the service.

DISCLOSURE

Technical Problem

The disclosure is conceived to solve the problems of the related art as described above, and an aspect of the disclosure is to provide a system for providing a query processing service based on personal-information protection to prevent personal information, which needs to be protected, from being transmitted to/stored in/managed by a cloud service server regardless of a user's awareness, when a service provider processes the query content, which is given by the user to solve a problem, through a public service or a cloud service.

Technical Solution

To achieve the foregoing technical aspects as described above, the disclosure proposes a system for providing a query processing service based on personal-information protection, the system including: a client terminal configured to allow a user to input and send query content for solving a problem; a relaying and processing server configured to extract and process personal information contained in the query content received from the client terminal, transmit processed query content comprising the processed personal information to a cloud service server, and transmit an answer to a query received from the cloud service server to the client terminal; and the cloud service server configured to generate the answer to the query by analyzing the processed query content received from the relaying and processing server, and transmit the answer to the query to the relaying and processing server.

Here, the relaying and processing server may include: a personal-information extractor configured to extract common personal-information identification data having a common characteristic pattern and individual personal-information identification data having an individual characteristic pattern from the query content; and a relaying processor configured to process the common personal-information identification data and the individual personal-information identification data extracted by the personal-information extractor, and transmit the processed query content including the processed data.

Here, the common personal-information identification data and the individual personal-information identification data extracted by the personal-information extractor may be processed by encoding or substitution.

Further, the relaying and processing server may further include a post verifier configured to extract additional personal-information identification data having a modified characteristic pattern from the query content after transmitting the answer to the query to the client terminal.

Further, the system may further include an additional information providing server configured to provide additional information for reinforcing the answer to the query, based on a request of the relaying and processing server.

Advantageous Effects

According to the disclosure, when a service provider processes query content, which is given by a user to solve a problem, through a public service or a cloud service, it is advantageously possible to prevent personal information, which needs to be protected, from being transmitted to/stored in/managed by a cloud service server regardless of a user's awareness.

BEST MODE

Figure 1:
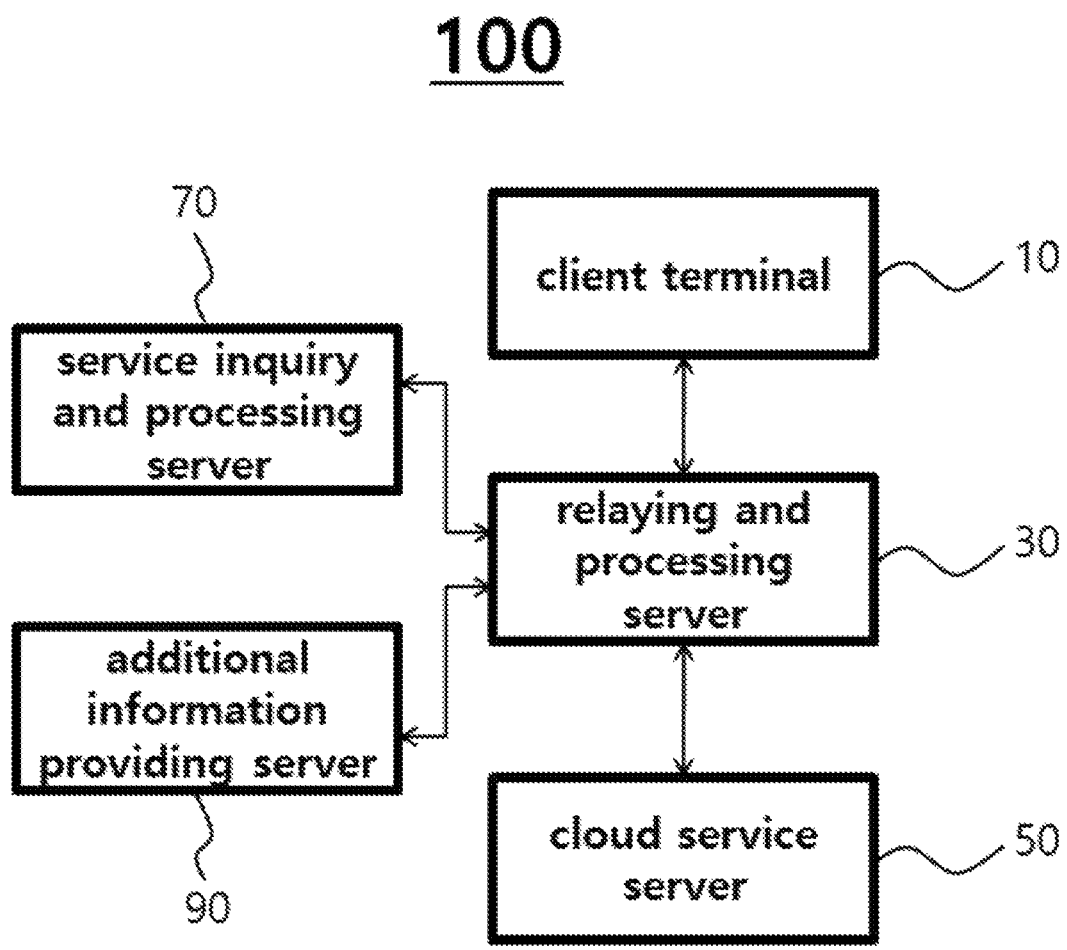
FIG. 1 is a schematic block diagram of a system for providing a query processing service based on personal-information protection according to an embodiment of the disclosure.
Figure 2:
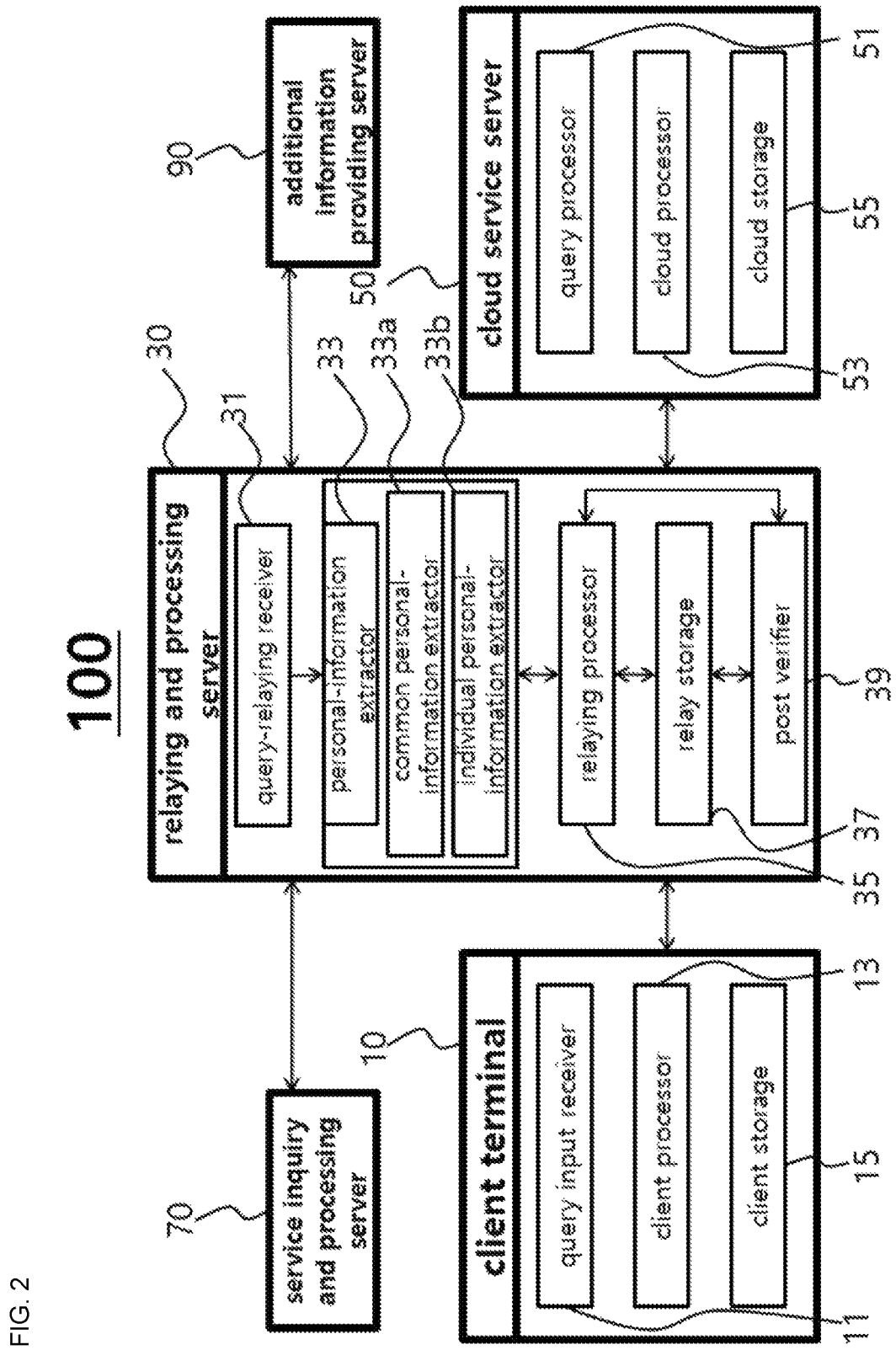
FIG. 2 is a detailed block diagram of a system for providing a query processing service based on personal-information protection according to an embodiment of the disclosure.

FIG. 1 is a block diagram of a system for providing a query processing service based on personal-information protection according to an embodiment of the disclosure, and FIG. 2 is a detailed block diagram of the system.

As shown in FIGS. 1 and 2, a system 100 for providing a query processing service based on personal-information protection according to an embodiment of the disclosure includes a client terminal 10 used by a user to input query content; a relaying and processing server 30 configured to screen the query content and extract and process personal information, which needs to be protected, from the query content, and relay the query content including the processed personal information, i.e. the processed query content; and a cloud service server 50 configured to analyze the processed query content and deal with a query, i.e. generate and provide an answer to the query.

Further, as necessary, the system 100 for providing a query processing service based on personal-information protection according to an embodiment of the disclosure may additionally include a service inquiry and processing server 70 configured to store and manage data to be referenced in the relaying and processing server 30; and an additional information providing server 90 configured to provide additional information requested by the relaying and processing server.

The client terminal 10 refers to a terminal that is used by a user in inputting and sending query content to solve a problem. Such a client terminal 10 may include any terminal connectable to a wired/wireless network.

The query content refers to content that is sent to the relaying and processing server 30 by a user. The query content may include only one among a text, a voice and an image, or a combination of two or more of them.

Meanwhile, the query content is conceptualized to include not only content that is unilaterally input by a user using the client terminal 10 and transmitted to the relaying and processing server 30, but also content that is input and transmitted as a response to a request of the relaying and processing server 30. Therefore, the query content transmitted to the relaying and processing server 30 by the user to solve a problem may include one piece of query content, or may include a plurality of pieces of query content as responses to the requests of the relaying and processing server 30.

The query content input through the client terminal 10 is transmitted to the relaying and processing server 30 and then relayed. In other words, the relaying and processing server 30 extracts and processes personal information from the query content received from the client terminal 10, transmits processed query content including the processed personal information to the cloud service server 50, and transmits a response to a query received from the cloud service server 50 to the client terminal 10.

First, the relaying and processing server 30 may include service providing servers respectively operated by service-providing business operators, i.e. service providers of providing specific services (e.g. financial, medical, travel, education, lodging, shopping, and the like services), or may include a service providing server operated by a service agency that provides integrated services on behalf of the service-providing business operators of providing such specific services.

The relaying and processing server 30 does not intactly relay the query content from the client terminal 10 to the cloud service server 50, but screens whether the query content includes personal information that needs to be protected, extracts the personal information that needs to be protected, processes the extracted personal information by a specific method, and transmits the processed query content, into which the processed personal information and the rest of the query content with none of the personal information are merged, to the cloud service server 50.

For example, when the query content includes a sentence of "a, b, c, c, e, f, g . . . " and it is identified that "a" corresponding to a word or data (string) is relevant to the personal information or includes the personal information, the relaying and processing server 30 processes the "a" into "*" and then transmits "*, b, c, c, e, f, g . . . " corresponding to the processed query content including the processed personal information of "*" to the cloud service server 50.

Ultimately, the relaying and processing server 30 does not intactly transmit the query content including the personal information to the cloud service server 50, but processes a part corresponding to personal information to be unrecognizable by people and then transmits the processed query content to the cloud service server 50.

The cloud service server 50 generates a response to a query based on the processed query content and transmits the response to the relaying and processing server 30. Then, the relaying and processing server 30 relays the answer to the query from the cloud service server 50 to the client terminal 10 which has the query to solve the problem.

As described above, the cloud service server 50 performs operations of analyzing the processed query content received from the relaying and processing server 30, generating the answer to the query, and transmitting the response to the relaying and processing server 30. The cloud service server 50 is a business-operator server for providing a cloud service, and makes up a public service system. According to the disclosure, the cloud service server 50 is equivalent to a cloud service server that is used by a service agency or service provider related to specific services operated by the relaying and processing server 30. Specifically, the cloud service server 50 constitutes a cloud service system or public service system that responds to, replies to, and handles various queries, requests, and services.

When the cloud service server 50 receives the processed query content, the cloud service server 50 is unable to recognize the processed personal information contained in the received processed-query content and therefore operates in principle to process a query, i.e. generate the answer to the query by analyzing the rest of the query content with none of the processed personal information and transmit the response to the relaying and processing server 30.

MODE FOR INVENTION

Below, specific configurations, operations and interactions of the relaying and processing server 30, the client terminal 10 and the cloud service server 50, which constitute the system 100 for providing the query processing service based on personal-information protection, will be described in detail.

First, the relaying and processing server 30 includes a query-relaying receiver 31 to receive query content from the client terminal 10. The query-relaying receiver 31 transmits the query content to the personal-information extractor 33 so as to analyze whether the query content includes the personal information.

The personal-information extractor 33 extracts the personal information contained in the query content and required to be protected. The personal information may be classified into two major kinds of information, for example, common personal-information identification data regarded as personal information applied in common to people, and individual personal-information identification data regarded as personal information related to specific services and applied case by case to individuals.

The common personal-information identification data refers to personal information used in common for users or people, for example, identification data such as e-mail addresses, phone numbers, social security numbers, etc. Such common personal-information identification data includes a characteristic pattern identifiable as personal information to be protected, i.e. a common characteristic pattern. For example, the common characteristic pattern refers to a pattern by which the common personal-information identification data is characterized, and includes patterns of ".com", ".net", etc. by which the e-mail addresses are characterized, patterns of "010", "0502", etc. by which the phone numbers are characterized, patterns of "****-1****" considering the number of digits by which the social security numbers are characterized, and so on.

On the other hand, the individual personal-information identification data refers to personal information individually used in connection with specific services, for example, personal information related to financial, lodging, travel, education, medical, shopping, and the like specific services. In more detail, the individual personal-information identification data refers to identification data such as a "credit rating: first class" related to the financial service, a "diagnosis: mental illnesses" related to the medical service, etc. Such individual personal-information identification data also includes a characteristic pattern identifiable as personal information to be protected, i.e. an individual characteristic pattern. For example, the individual characteristic pattern may correspond to "credit", "class", etc. as patterns by which the individual personal-information identification data, i.e. the "credit rating: first class" is characterized, and "diagnosis", "mental illnesses", etc. as patterns by which the "diagnosis: mental illnesses" is characterized.

Like this, the personal-information extractor 33 according to the disclosure performs operation of extracting the common personal-information identification data having the common characteristic pattern and the individual personal-information identification data having the individual characteristic pattern from the query content. The personal-information extractor 33 is configured to stepwise extract the two kinds of personal information. To this end, the personal-information extractor 33 includes a common personal-information extractor 33a and an individual personal-information extractor 33b.

The common personal-information extractor 33a extracts the common personal-information identification data having the common characteristic pattern from the query content. Specifically, the common personal-information extractor 33a screens the query content, detects whether there is a common characteristic pattern, and extracts data (strings) including the common characteristic pattern as the common personal-information identification data when the common characteristic pattern is detected. At least one common characteristic pattern is previously stored and managed in a relay storage 37, and continuously updated. Therefore, the common personal-information extractor 33a detects the common characteristic pattern through the operation of screening whether the query content includes the common characteristic pattern(s) stored and managed in the relay storage 37, and extracts the common personal-information identification data including the common characteristic pattern from the query content.

On the other hand, the individual personal-information extractor 33b extracts the individual personal-information identification data having the individual characteristic pattern from the query content. Specifically, the individual personal-information extractor 33b screens the query content, detects whether there is an individual characteristic pattern, and extracts data (strings) including the individual characteristic pattern as the individual personal-information identification data when the individual characteristic pattern is detected. At least one individual characteristic pattern is previously stored and managed in the relay storage 37, and continuously updated. Therefore, the individual personal-information extractor 33b detects the individual characteristic pattern through the operation of screening whether the query content includes the individual characteristic pattern(s) stored and managed in the relay storage 37, and extracts the individual personal-information identification data including the individual characteristic pattern from the query content.

The common and individual personal-information identification data extracted by the personal-information extractor 33 is processed by a relaying processor 35, and then transmitted to the cloud service server 50 as contained in the transmitted query content. Thus, the relaying processor 35 processes the extracted common personal-information identification data and the extracted individual personal-information identification data by a predetermined method, and then transmits the processed query content, obtained by applying the processed personal-information identification data to the query content, to the cloud service server 50.

In brief, the relaying processor 35 processes the common personal-information identification data and the individual personal-information identification data extracted by the personal-information extractor 33, and then transmits the processed query content including the processed data to the cloud service server 50. In more detail, the relaying processor 35 receives the query content received in the query-relaying receiver 31, generates the processed query content obtained by processing the common personal-information identification data and the individual personal-information identification data, which are extracted from the personal-information extractor 33 contained in the received query content, through a predetermined method, and transmits the processed query content to the cloud service server 50.

Here, the process performed in the relaying processor 35 refers to a process that the common personal-information identification data and the individual personal-information identification data contained in the query content are handled not to be recognizable by people. Specifically, the common personal-information identification data and the individual personal-information identification data extracted in the personal-information extractor 33 are processed by the relaying processor 35 to be encoded or substituted. In other words, the relaying processor 35 encodes, replaces or substitutes the common personal-information identification data and the individual personal-information identification data with a specific character (string) or masking not to be recognizable.

When the relaying processor 35 transmits the processed query content to the cloud service server 50, the cloud service server 50 processes a query, i.e. generates an answer to the query, based on the processed query content, thereby transmitting the response to the relaying processor 35 of the relaying and processing server 30.

To this end, the cloud service server 50 includes a query processor 51, a cloud processor 53, and a cloud storage 55.

The cloud processor 53 receives the processed query content from the relaying processor 35, transmits the processed query content to the query processor 51, thereby processing the query, i.e. generating the answer to the query. Further, the cloud processor 53 processes the processed query content to be stored in the cloud storage 55. In this case, the cloud processor 53 processes the processed query content to be stored in the cloud storage 55 as classified matching message identification (ID).

The query processor 51 receives the processed query content from the cloud processor 53, analyzes the processed query content to process the query, i.e. generate the answer to the query, and transmits the response to the cloud processor 53. Then, the cloud processor 53 stores the answer to the query in the cloud storage 55 as matched with the message ID, and at the same time transmits the answer to the query together with the message ID to the relaying processor 35.

Like this, when a message corresponding to the answer to the query is transmitted to the relaying and processing server 30, specifically, to the relaying processor 35, the cloud processor 53 transmits and receives the message ID matching the answer to the query along with the message. Of course, the cloud processor 53 processes the answer to the query and its associated processed query content to be stored and managed matching the message ID in the cloud storage 55.

When the relaying processor 35 receives both the answer to the query and the message ID from the cloud processor 53, the relaying processor 35 processes the processed query content associated with the answer to the query to be stored and managed in the relay storage 37 as matched with the message ID. In this case, the relaying processor 35 may also process the answer to the query to be stored and managed together with the processed query content as matched with the message ID.

Specifically, the relaying processor 35 processes the processed query content to be transmitted to the cloud service server 50 and at the same time stored in the relay storage 37, and stores and manages the message ID matching the processed query content stored in the relay storage 37 when both the answer to the query and the message ID are received from the cloud processor 53 as a process result of the processed query content.

Ultimately, the relaying processor 35 processes the processed query content to be stored and managed matching the message ID received from the cloud processor 53 so that all pieces of the processed query content to be transmitted to the cloud service server 50 can be classified. Therefore, when specific processed query content needs to be deleted or additionally processed in the future based on post verification, the relaying processor 35 may use the message ID to make a request for deleting the specific processed query content or additionally processing the personal-information identification data contained in the specific processed query content to the cloud processor 53. In this regard, descriptions will be made later.

As described above, the relay storage 37 is configured to store and manage the common characteristic pattern and the individual characteristic pattern, and store and manage the processed query content as matched with the message ID. Like this, the relay storage 37 is configured to store and manage the processed query content processed by the relaying processor 35 as matched with the message ID.

When the processed personal information contained in the processed query content is encoded and then stored in the relay storage 37, the personal information may be decoded and restored in a case where restoration is needed later. In other words, when a user makes a request for inquiring about the processed query content stored and managed in the relay storage 37, the processed personal information subjected to encoding is restored by decoding and then transmitted to the client terminal 10 that the user uses.

On the other hand, when the processed personal information contained in the processed query content is processed by substitution or masking and then stored in the relay storage 37, a problem may rise because the processed personal information is not a decoding target in a case where restoration is needed later. Therefore, when the processed personal information is processed by methods other than encoding, e.g. processed by masking or substitution, the relaying processor 35 stores the processed query content in the relay storage 37 along with the original of the processed personal information (or raw information, i.e. the personal information before being processed). In result, when a user makes a request for inquiring about the processed query content stored and managed in the relay storage 37, the processed personal information processed by methods other than encoding, e.g. processed by masking or substitution may be restored based on the original stored and managed together, and then transmitted to the client terminal 10 that the user uses.

As described above, the relaying processor 35 receives the answer to the query along with the message ID from the cloud processor 53, and stores and manages the message ID as matched with the processed query content related to the answer to the query. Further, the relaying processor 35 transmits the answer to the query to the client terminal 10 that the user uses to input and send the query content for solving the problem. Then, the user can solve the problem needed to be solved.

With such a process, information input by a user to solve a problem, i.e. query content is transmitted to the cloud service server 50 through the relaying process of the relaying and processing server 30, and the processed query, i.e. the answer to the query is transmitted from the cloud service server 50 to the client terminal 10 via the relaying and processing server 30, thereby finally completing the provision of the query processing service.

When the provision of the query processing service is completed by such a process, the post verification may be performed to enhance the personal information protection. To this end, the relaying and processing server 30 according to the disclosure further includes a post verifier 39 to extract additional personal-information identification data having a modified characteristic pattern from the query content after the answer to the query is transmitted to the client terminal 10.

There may be personal information, which is not extracted, while the personal information is first extracted from the query content, i.e. while the personal-information extractor 33 extracts the personal information. In other words, the additional personal-information identification data, which is not extracted by the personal-information extractor 33, may be still remained in the processed query content.

Therefore, when the answer to the query is completely transmitted to the client terminal 10, the relaying processor 35 controls the post verifier 39 to extract the additional personal-information identification data from the processed query content stored in the relay storage 37 as matched with the message ID.

In other words, when the relaying processor 35 instructs the post verifier 39 to perform the post verification of the processed query content, the post verifier 39 screens the processed query content stored in the relay storage 37, identifies whether there is a modified characteristic pattern, and extracts the additional personal-information identification data having the modified characteristic pattern when it is identified that there is the modified characteristic pattern.

The modified characteristic pattern includes not only patterns modified from the common characteristic pattern and the individual characteristic pattern, but also a pattern of characterizing personal information which is not extracted as the common characteristic pattern and the individual characteristic pattern. For example, the modified characteristic pattern may correspond to not ".com (dot com)" but ". com (dot com with a blank space)" related to the e-mail, and correspond to a pattern in which spelling or orthography is not correct as compared with those of the common and individual characteristic patterns.

The modified characteristic pattern is also stored and managed in the relay storage 37, and continuously updated. If it is taken into account that problems in spelling, orthography, word spacing, etc. are frequently involved in query content input by a user, there is a need of considerably increasing the number of cases for the modified characteristic pattern, and there is a need of a continuous update to continuously add various patterns.

When the modified characteristic pattern is detected, the post verifier 39 extracts the additional personal-information identification data based on data (strings) including the modified characteristic pattern, and transmits the additional personal-information identification data to the relaying processor 35. Then, the relaying processor 35 processes the additional personal-information identification data, and stores reprocessed query content including the processed additional personal-information identification data again in the relay storage 37. Of course, the message ID of the reprocessed query content is the message ID matching the processed query content.

Meanwhile, the relaying processor 35 requests change of the message, i.e. the processed query content while transmitting the reprocessed query content to the cloud processor 53 along with the message ID matching the processed query content (i.e. the reprocessed query content). Then, the cloud processor 53 retrieves the message corresponding to the message ID, i.e. the processed query content, among the messages stored and managed in the cloud storage 55 with reference to the message ID, and replaces the retrieved message with the reprocessed query content.

In result, the relaying and processing server 30 autonomously performs the post verification to enhance the personal-information protection, thereby having an effect on further guaranteeing the personal-information protection.

Meanwhile, the post verification may be carried out by a user's intention. To this end, the client terminal 10 includes a client processor 13 as well as a query input receiver 11 to which a query is input and a client storage 15 in which query content and messages received from the relaying and processing server 30 are stored and managed.

The query input receiver 11 allows a user to input query content. Then, the client processor 13 transmits the query content to the relaying and processing server 30, specifically, to the query-relaying receiver 31, and at the same time stores the query content in the client storage 15.

Then, the client processor 13 copes with request of the relaying processor 35 in the relaying and processing server 30. For example, when the relaying processor 35 requests an additional query to process the query, the client processor 13 serves to inform a user of the request and then transmit the additional query input through the query input receiver 11 to the relaying processor 35.

Meanwhile, the client processor 13 may make a request for inquiring about pieces of query contents under a user's control after receiving an answer to the query from the relaying and processing server 30, specifically, from the relaying processor 35. When the relaying processor 35 permits the inquiry in response to the request, the user can look up the pieces of query content. The user may make an inquiry about the processed query content by directly accessing the relay storage 37, or may make an inquiry about the query content restored under control of the relaying processor 35.

When it is found on inquiry that a piece of processed query content is desired to be removed or a part of the processed query content is required to be processed, the piece of processed query content desired to be removed or a processing required part of the processed query content are sent to the relaying processor 35 through the client processor 13. Then, the relaying processor 35 transmits the message ID matching the processed query content required by the user to be removed to the cloud processor 53 so as to remove the processed query content stored in the cloud storage 55, or processes the processing required part requested by the user and stores the reprocessed query content including this processed part again in the relay storage 37. Of course, the message ID of the reprocessed query content is the message ID matching the processed query content.

Meanwhile, the relaying processor 35 makes a request for changing the message, i.e. the processed query content while transmitting the reprocessed query content to the cloud processor 53 along with the message ID matching the processed query content (i.e. the reprocessed query content). Then, the cloud processor 53 retrieves the message corresponding to the message ID, i.e. the processed query content, among pieces of messages stored and managed in the cloud storage 55 with reference to the message ID, and performs the change by replacing the found message with the reprocessed query content.

In result, the user performs the post verification in person to enhance the personal-information protection, thereby having an effect on further guaranteeing the personal-information protection.

Meanwhile, the cloud service server 50 according to the disclosure generates a response to a query based on an unprocessed part of the processed query content, i.e. based on information other than the processed personal information. However, when it is identified that the received processed-query content is not enough to process a query and generate an answer to the query, the cloud service server 50, specifically, the query processor 51 transmits a query, which does not directly request personal information, i.e. a bypassing query for recognizing specific personal information to the relaying processor 35 through the cloud processor 53.

Then, the relaying processor 35 receives an answer to the bypassing query from the client terminal 10 that the user uses, and provides the answer to the query processor 51 through the cloud processor 53. Then, the query processor 51 finally generates an answer to the query based on the answer to the bypassing query, and provides the answer to the client terminal 10 through the relaying and processing server 30.

The bypassing query for recognizing the personal information is not a query asking for an answer through which the personal information is directly exposed, but a query making it possible to recognize the personal information without exposing the personal information. For example, when the query processor 51 needs to know a credit rating of a user in order to answer a query, the processed query content is not enough to generate the answer to the query because personal information about such a credit rating in the processed query content has already been processed (e.g. subjected to encoding, substitution or masking).

In this case, the query processor may send the bypassing query for recognizing the personal information, by which choose No. 1 is chosen for the first class, No. 2 is chosen for a class between the second and third classes, and No. 3 is chosen for a class lower than the third class, to the relaying and processing server, and receive an answer to the bypassing query through the client terminal. In this case, the answer to the sent bypassing query is one among No. 1, No. 2 and No. 3, and therefore the personal information is not transmitted to, stored in and managed by the cloud service server.

Thus, according to the disclosure, even when the sent processed query content is not enough to generate the answer, it is possible to finally generate and provide the answer to the query without exposing the personal information required to be protected, thereby having effects on achieving both the guarantee of the personal-information protection and the improvement in the quality of the query processing service.

Meanwhile, the relaying and processing server 30, specifically, the relaying processor 35 receives the answer to the query from the cloud service server 50, specifically, from the cloud processor 53, and directly transmits the received answer to the query to the client terminal 10. However, as necessary, additional information useful for the client terminal 10, specifically, for a user may be added to the received answer and transmitted to the client terminal 10.

To this end, the system 100 for providing the query processing service based on personal-information protection according to the disclosure may further include the additional information providing server 90 configured to provide additional information requested by the relaying processor 35. In other words, the system 100 for providing a query processing service based on personal-information protection according to an embodiment of the disclosure may further include the additional information providing server 90 configured to provide additional information for reinforcing the answer to the query, as requested by the relaying and processing server 30.

The additional information providing server 90 may include a server for providing additional information about one of weather information, traffic information, medical information, etc. or a server for providing at least two pieces of information together.

When the relaying processor 35 identifies that there is a need of adding additional information after receiving the answer to the query, the relaying processor 35 makes a request for the additional information to the additional information providing server 90, receives the corresponding additional information, the answer to the query, and transmits the additional information to the client terminal 10. The identification of whether there is a need of adding the additional information is based on a preset policy. For example, based on a preset policy that weather information is added and transmitted as the additional information when the answer to the query is information about a travel destination, the relaying processor 35 makes a request for the weather information about the corresponding travel destination to the additional information providing server 90 and receives the weather information, thereby transmitting the answer to the query to the client terminal 10 along with the additional information of the weather information.

Meanwhile, the relaying and processing server 30 according to the disclosure needs information related to services or customers and needs to provide the information. To this end, the system 100 for providing the query processing service based on personal-information protection according to the disclosure further includes the service inquiry and processing server 70 so that the relaying and processing server 30 can be provided with information for processing the services and information needed for processing the query and customer information.

Although a method of providing a query processing service based on personal-information protection has been described with the foregoing operations of the system 100 for providing the query processing service based on personal-information protection, the method will be schematically summarized as follows.

Figure 3:
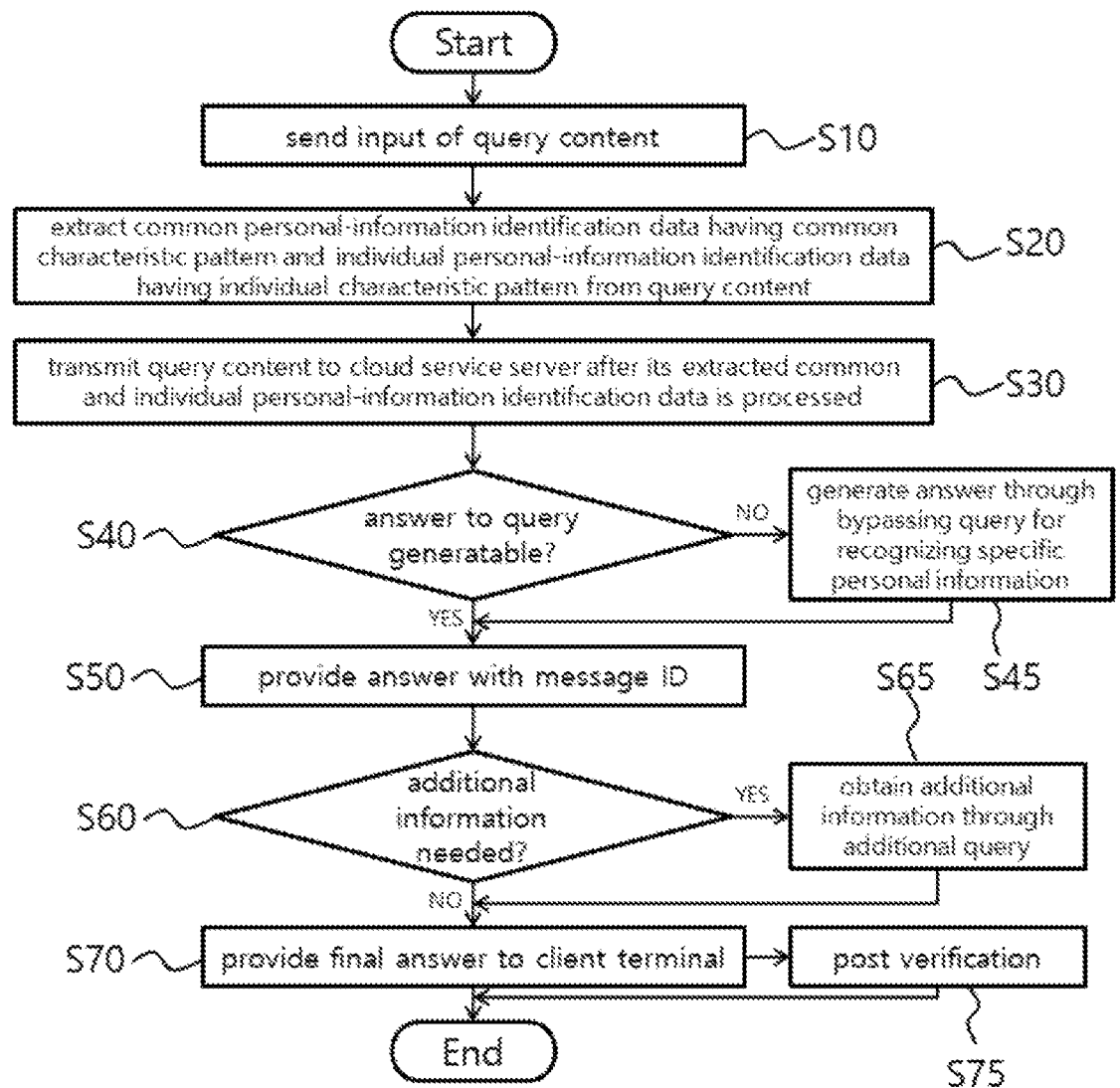
FIG. 3 is a flowchart for explaining a method of providing a query processing service based on personal-information protection using a system for providing the query processing service based on the personal-information protection according to an embodiment of the disclosure.

As shown in FIG. 3, the method of providing a query processing service based on personal-information protection using the system 100 for providing a query processing service based on personal-information protection according to an embodiment of the disclosure first starts when a user inputs query content for solving a problem (S10).

Then, the relaying and processing server extracts the common personal-information identification data having the common characteristic pattern and the individual personal-information identification data having the individual characteristic pattern from the query content (S20). Thereafter, the extracted common and individual personal-information identification data is processed (e.g. subjected to encoding, substitution or masking), and the processed query content is transmitted to the cloud service server (S30). With this process, the query content input by the user is not intactly transmitted to the cloud service server, but transmitted as the personal information that needs to be protected is processed not to be recognizable in the cloud.

The cloud service server generates an answer to a query based on the processed query content. Preferentially, it is identified whether the answer to the query can be generated by only the received processed-query content (S40). As a result of the identification, when the received processed-query content is enough to process the query, i.e. generate the answer to the query, the generated answer to the query is provided together with the message ID to the relaying and processing server (S50). On the other hand, when the received processed-query content is not enough to generate the answer to the query, the answer to the query is generated using the bypassing query for recognizing specific personal information (S45). Then, the answer to the query generated using the bypassing query is provided together with the message ID (S50).

The relaying and processing server receives the message ID and the answer to the query, and identifies whether additional information needs to be added in addition to the answer to the query, based on a preset policy (S60). As a result of the identification, when the additional information is not needed, the answer to the query is directly transmitted to the client terminal (S70). On the other hand, when the additional information is needed, the additional information is obtained by making an additional query to the additional information providing server (S65). Next, both the answer to the query and the obtained additional information are transmitted to the client terminal.

When the client terminal receives the answer to the query through the foregoing processes, the post verification may be additionally performed by a user's intention or the relaying and processing server as described above (S75).

Although a few embodiments of the disclosure have been described, these are for illustrative purpose only and it will be appreciated by a person having an ordinary skill in the art that various changes and equivalents can be made from these embodiments. Therefore, the true technical protection scope of the disclosure should be defined in the appended claims.

INDUSTRIAL APPLICABILITY

A system for providing a query processing service based on personal-information protection according to the disclosure has industrial applicability to prevent personal information, which needs to be protected, from being transmitted to/stored in/managed by a cloud service server regardless of a user's awareness, because personal information that needs to be protected is processed into unrecognizable information and then processed query content with the processed personal information is transmitted to the cloud service server without intactly transmitting the query content when a service provider processes the query content, which is given by the user to solve a problem, through a public service or a cloud service.

The invention claimed is:

1. A system for providing a query processing service based on personal-information protection, the system comprising:
   a client terminal configured to allow a user to input and send query content for solving a problem;
   a relaying and processing server configured to extract and process personal information contained in the query content received from the client terminal, transmit processed query content the processed personal information to a cloud service server, and transmit an answer to a query received from the cloud service server to the client terminal; and
   the cloud service server configured to generate the answer to the query by analyzing the processed query content received from the relaying and processing server, and transmit the answer to the query to the relaying and processing server,
   wherein the client terminal and the cloud service server communicate each other only via the relaying and processing server,
   wherein the relaying and processing server comprises:
      a personal-information extractor having a common personal information extractor and an individual personal information extractor,
         the common personal information extractor configured to extract common personal-information identification data having a common characteristic pattern, and
         the individual personal information extractor configured to extract individual personal-information identification data having an individual characteristic pattern from the query content; and
      a relaying processor configured to process the common personal-information identification data and the individual personal-information identification data extracted by the personal-information extractor, and transmit the processed query content comprising the processed data.

2. The system according to claim 1, wherein the common personal-information identification data and the individual personal-information identification data extracted by the personal-information extractor is processed by encoding or substitution.

3. The system according to claim 1, wherein the relaying and processing server further comprises a post verifier configured to extract additional personal-information identification data having a modified characteristic pattern from the query content after transmitting the answer to the query to the client terminal.

4. The system according to claim 1, further comprising an additional information providing server configured to provide additional information for reinforcing the answer to the query, based on a request of the relaying and processing server.

* * * * *